United States Patent [19]

Derby

[11] Patent Number: 4,833,008
[45] Date of Patent: May 23, 1989

[54] METALIZED FABRIC

[75] Inventor: Norwin C. Derby, Dallas, Tex.

[73] Assignee: B.A.G. Corporation, Dallas, Tex.

[21] Appl. No.: 51,201

[22] Filed: May 18, 1987

Related U.S. Application Data

[63] Continuation of Ser. No. 785,473, Oct. 4, 1985, abandoned.

[51] Int. Cl.[4] .............................................. B32B 7/00
[52] U.S. Cl. ................................ 428/246; 156/244.11; 156/272.2; 156/324; 428/252; 428/263; 428/285; 428/457
[58] Field of Search ............... 428/246, 285, 457, 252, 428/263; 156/244.11, 272.2, 324

[56] References Cited

U.S. PATENT DOCUMENTS

| | | |
|---|---|---|
| 2,361,943 | 1/1942 | Issoglio et al. |
| 3,445,055 | 5/1969 | Port et al. ................ 139/389 |
| 3,555,170 | 1/1971 | Petzetakis et al. |
| 3,596,134 | 7/1971 | Burke |
| 3,907,955 | 9/1975 | Viennot |
| 3,961,655 | 6/1976 | Nattrass et al. |
| 4,107,452 | 8/1978 | Razvi |
| 4,143,796 | 3/1979 | Williamson et al. |
| 4,467,005 | 8/1984 | Pusch ...................... 428/922 |
| 4,560,608 | 12/1985 | Pusch ...................... 428/285 |
| 4,621,012 | 11/1986 | Pusch ...................... 428/246 |

*Primary Examiner*—James J. Bell
*Attorney, Agent, or Firm*—Michael A. O'Neil

[57] ABSTRACT

The invention comprises a metalized fabric having a lower layer of fabric. Secured to the fabric layer is an upper film layer. At least a portion of the exposed surface of the film layer is metalized.

5 Claims, 2 Drawing Sheets

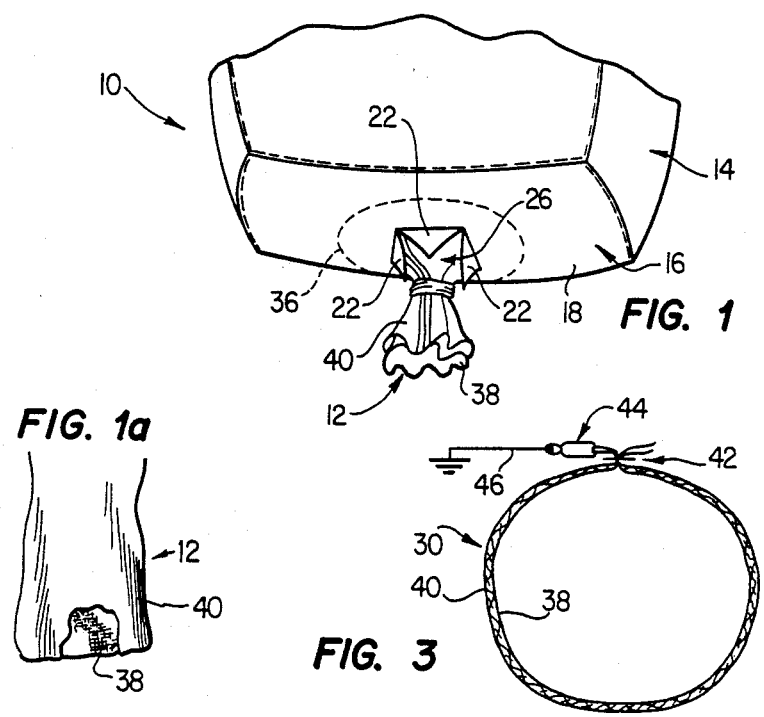
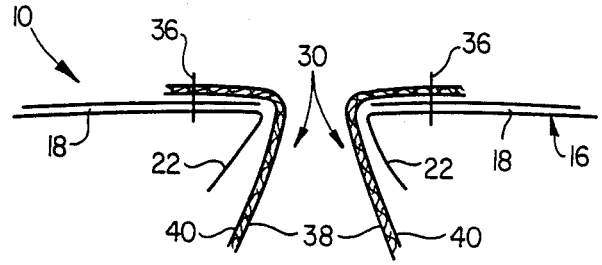

METALIZED FABRIC

This application is a continuation of application Ser. No. 785,473, filed Oct. 4, 1985, now abandoned.

TECHNICAL FIELD

This invention relates to the manufacture of fabric, and more particularly to the manufacture of plastic fabric having a metalized surface.

BACKGROUND AND SUMMARY

Fabrics are utilized in numerous situations requiring strength, flexibility and durability. For example, fabrics are often used in the construction of containers for storing and/or transporting granular or powder materials, as well as in the construction of shelter for goods, equipment, people, and the like. Traditionally, fabrics have been constructed of natural fibers; however, in recent years synthetic fibers manufactured from polypropylene or other plastics have come into extensive use since they are generally stronger and more durable than fabrics made of natural fiber.

Characteristics of fabrics in general make their use undesirable in some circumstances. For example, many granular and even liquid materials develop a static-electric charge through friction as they are poured into, discharged from or vibrated within a receptacle. However, since fabrics are not electrically conductive, discharge of static-electricity from such materials contained by fabric receptacles is difficult, if not impossible, posing the danger of explosion or fire caused by an electrical spark. Fabrics also cannot be used in applications requiring an air or moisture-tight barrier due to their fibrous nature. Plastic fabrics, in particular, are also highly susceptible to degradation caused by ultraviolet light and therefore cannot be used in direct sunlight, for example, without incurring a substantial reduction in their flexibility and strength.

In an effort to eliminate the foregoing combination of undesirable characteristics, fabrics manufactured of plastic fibers have been covered with a metallic laminate such as foil made of aluminum or other electrically conductive metal. This approach involves securing the foil to one side of the synthetic fabric by means of a suitable adhesive. The laminated fabric may then be used to construct a receptacle, for example, with the foil laminate comprising the interior surface of the receptacle, thereby providing an electrically conductive surface through which the electrical charge can be discharged to an appropriate ground. The foil laminate may also be applied to portions of the synthetic fabric which will be exposed to ultraviolet light, thereby acting as a reflector to substantially reduce the amount of ultraviolet light contacting the fabric and the resultant degradation thereof. Use of foil laminates has also proved to be initially effective in reducing the transmission of gas and moisture through the underlying fabric.

Foil laminates in the past, however, have proven susceptible to abrasion, tearing and separation from the underlying fabric over a period of time, particularly along the edges of the foil laminate. For example, foil laminates used to cover the interior surface of fabric receptacle will often tear or separate from the underlying fabric due to abrasion from the contents of the receptacle as the receptacle is filled, emptied or transported. The cumulative effect of such abrasion quickly reduces the effectiveness of the foil layer as a grounding surface and often results in unwanted contamination of the contents of the bag with foil particles or flakes. In addition, damage to the foil laminates through normal wear and tear or due to handling of materials reduces the ability of the fabric to inhibit the passage of moisture and air and the ability of the laminate to protect the fabric against degradation from ultraviolet light.

The present invention comprises a highly durable metalized fabric which overcomes the foregoing disadvantages associated with foil-laminated fabrics. The metalized fabric includes a supporting layer of plastic fabric to which a layer of plastic film having an outer metalized surface is secured. In one embodiment, the plastic film is secured to the underlying fabric by extrusion lamination. The resulting metalized surface of the fabric is electrically conductive, resistant to degradation by ultraviolet light and is substantially air and moisture tight.

IN THE DRAWINGS

A more complete understanding of the invention may be had by reference to the following Detailed Description when taken in conjunction with the accompanying FIGURE which schematically illustrates the contruction of fabric incorporating the invention.

DETAILED DESCRIPTION

Figure 4:
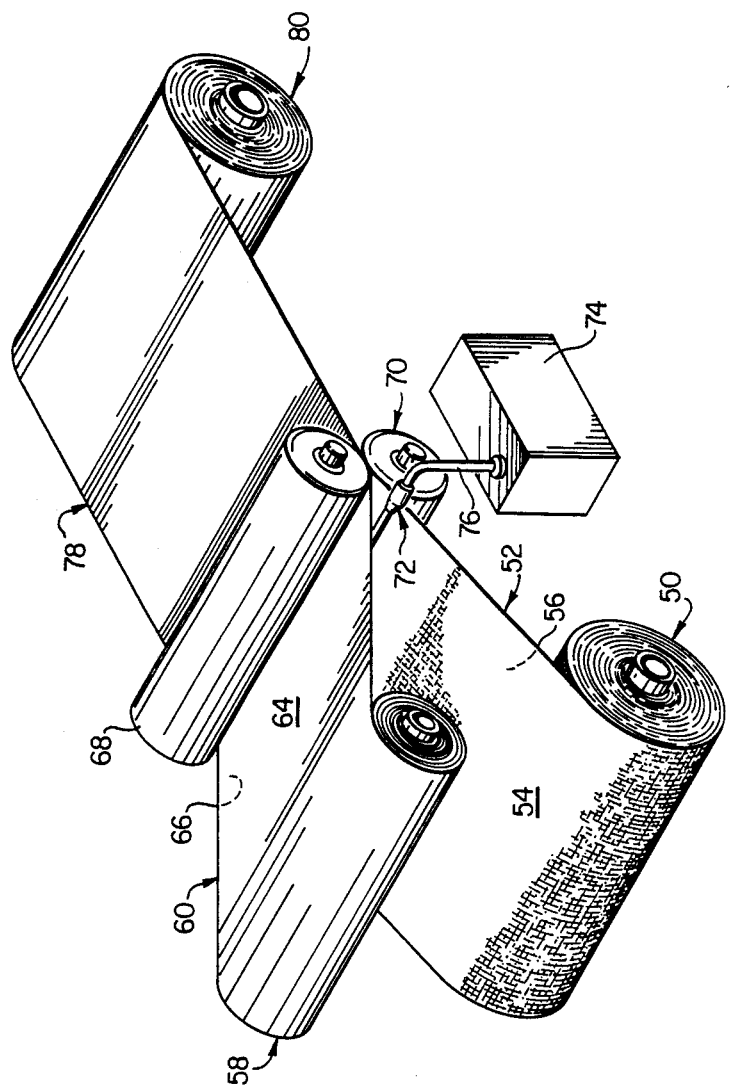

The FIGURE schematically illustrates the construction of the present invention. A roll 10 comprises a length of plastic fabric 12, such as woven polyethelene or polypropylene, having an upper surface 14 and an opposing lower surface 15. Supported above the roll 10 of plastic fabric is a roll 16 comprising a length of plastic film 18 having a metalized upper surface 20 and a lower surface 21. The length of fabric 12 and the length of film 18 are manufactured from the same type of plastic. The film 18 is oriented in two substantially perpendicular directions, thereby strengthening the film against tearing or breaking.

The upper surface 20 of the length of film 18 is metalized continuously along its entire length by conventional methods to a level which is electrically conductive. For example, one such method includes vaporization of an electrically conductive metal within a vacuum. The surface 20 of the length of film 18 is exposed to the metallic vapors within the vacuum while opposing electrical charges are imposed on the metal vapor and the film 18. The opposing charge causes the vapor to deposit or plate onto the film forming a strong bond therebetween. Typically, a metallic layer no more than one or two molecules thick is required to provide an electrically conductive surface. In the embodiment shown, aluminum is deposited on the length of film 18 due to its relatively low melting point and low cost. However, it will be apparent that other electrically conductive metals, such as gold, silver, chromium, and the like may be utilized, if desired.

The film 18 is extrusion laminated to the fabric 12 by drawing the fabric 12 and the film 18 from rolls 10 and 16, respectively, through the nip between two compression rollers 22 and 24. Prior to passage of the film 18 and fabric 12 between the rollers 22 and 24, a thin layer of molten plastic of the same type from which the fabric 12 and the film 18 are manufactured is interposed between the lower, non-metalized surface of the film 18 and the upper surface 14 of the fabric 12 by a nozzel 25. Molten plastic is provided to the nozzel 25 from a supply 26 through a tube 27. As the fabric 12 and the metalized film 20 are compressed together between the rollers 22 and 24, the molten plastic partially melts both the non-metalized surface of the film 18 and the upper surface 14 of the fabric 12, resulting in a homogeneous layer of molten plastic which hardens when cooled to securely bond the film 18 to the underlying fabric 12. The resulting metalized fabric 28 exits from the compression rollers 22 and 24 and is collected on a take-up roll 20.

The fabric 28 can be used in the construction of a receptacle having an inner electrically conductive surface, such as is disclosed by U.S. Pat. No. 4,457,456, which disclosure is incorporated herein by reference. The fabric 28 can also be used in the construction of weather resistant tents, covers, shelters and the like having a reflective outer surface to shield against sunlight or other similar radiation. The metalized surface will also protect the fabric 28 from the harmful effects of ultraviolet radiation.

Although a preferred embodiments of the invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

I claim:

1. A metalized fabric consisting of:
   an outer layer of woven fabric;
   an inner layer of plastic film secured on one side to the outer layer of fabric; and
   a continuous outer layer of electrically conductive metal, vapor deposited on the other side of the plastic film.

2. The metalized fabric according to claim 1 wherein the outer layer of fabric is plastic and wherein the inner layer of film is secured to the outer layer of fabric by extrusion lamination.

3. The metalized fabric according to claim 2 wherein the outer layer of fabric and the inner layer of film are made of the same plastic material to strengthen the bond therebetween resulting from extrusion lamination.

4. A method of manufacturing a metalized fabric comprising the steps of:
   vapor depositing a continuous outer layer of electrically conductive metal onto one side of a layer of plastic film;
   extrusion laminating an outer layer of plastic fabric onto the other side of the plastic film by interposing a thin layer of molten plastic between the non-metalized surface of the film and one surface of the fabric; and
   drawing the fabric and the film through a nip between two compression rollers.

5. A method of manufacturing a metalized fabric comprising the steps of:
   vapor depositing a continuous outer layer of electrically conductive metal onto one side of a layer of plastic film;
   extrusion laminating an outer layer of plastic fabric onto the other side of the plastic film by interposing a thin layer of molten plastic of the same type as the film and the fabric between the non-metalized surface of the film and one surface of the fabric; and
   drawing the fabric and the film between a nip between two compression rollers.

* * * * *

REEXAMINATION CERTIFICATE (1873rd)

United States Patent [19]

Derby

[11] B1 4,833,008

[45] Certificate Issued Dec. 8, 1992

[54] METALIZED FABRIC

[75] Inventor: Norwin C. Derby, Dallas, Tex.

[73] Assignee: Super Sack Manufacturing Corporation, Dallas, Tex.

Reexamination Request:
No. 90/002,158, Oct. 5, 1990

Reexamination Certificate for:
Patent No.: 4,833,008
Issued: May 23, 1989
Appl. No.: 51,201
Filed: May 18, 1987

Related U.S. Application Data

[63] Continuation of Ser. No. 785,473, Oct. 4, 1985, abandoned.

[51] Int. Cl.⁵ ............................................. B32B 7/00
[52] U.S. Cl. .............................. 428/246; 156/244.11; 156/272.2; 156/324; 383/116; 428/252; 428/263; 428/285; 428/457
[58] Field of Search ................ 428/246, 314.2; 406/90; 493/217, 95; 156/244.11, 272.2, 324, 244.22, 244.23, 244.26, 244.27; 427/250, 251

[56] References Cited

U.S. PATENT DOCUMENTS

| 3,044,438 | 7/1962 | Osswald et al. | 427/251 |
| 3,636,185 | 1/1972 | Ruddell et al. | 427/251 |
| 3,637,458 | 1/1972 | Parrish | 428/314.2 |
| 4,149,755 | 4/1979 | Handleman et al. | |
| 4,230,763 | 10/1980 | Skolnick | 428/246 |
| 4,234,273 | 11/1980 | Handleman et al. | |

FOREIGN PATENT DOCUMENTS

| 371130 | 1/1938 | Canada. |
| 1108974 | 9/1981 | Canada. |
| 8203202 | 9/1982 | PCT Int'l Appl.. |

*Primary Examiner*—George F. Lesmes

[57] ABSTRACT

The invention comprises a metalized fabric having a lower layer of fabric. Secured to the fabric layer, is an upper film layer. At least a portion of the exposed surface of the film layer is metalized.

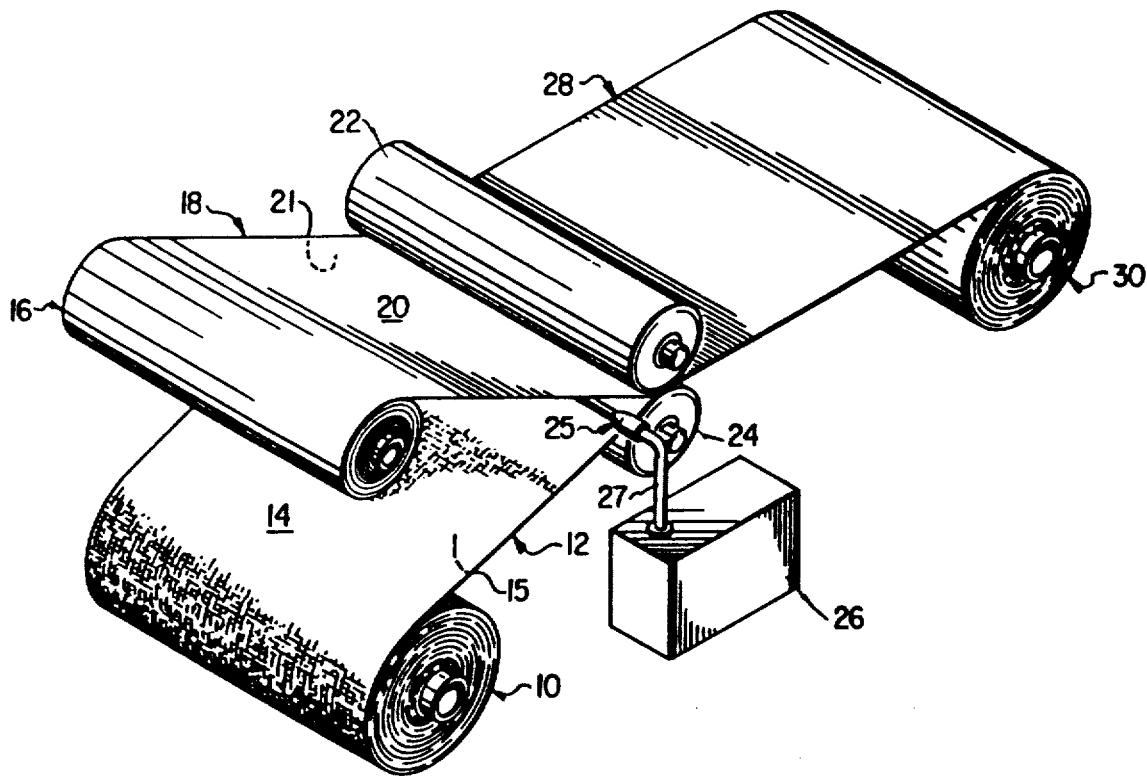

B1 4,833,008

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4 and 5 is confirmed.

Claims 1-3 having been finally determined to be unpatentable, are cancelled.

New claims 6-9 are added and determined to be patentable.

*6. A method for making metallized fabric comprising the steps of:*

*providing an outer layer of woven plastic fabric;*

*providing an inner layer of plastic film;*

*vapor depositing a continuous outer layer of electrically conductive metal on one side of the plastic film; and*

*subsequently securing the other side of the plastic film to the outer layer of woven fabric by extrusion lamination.*

*7. The metalized fabric made in accordance with the method of claim 6.*

*8. The method of claim 6 wherein the outer layer of fabric and the inner layer of film are made of the same plastic material to strengthen the bond therebetween resulting from the step of extrusion lamination.*

*9. The metallized fabric made in accordance with the method of claim 8.*

* * * * *